Figure 1:
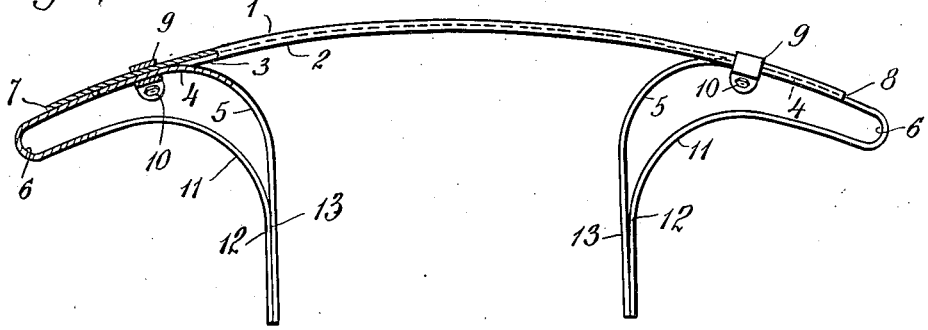

Feb. 26, 1924.

G. A. LYON

RESILIENT BUFFER

Original Filed Feb. 27. 1922

1,485,041

INVENTOR,
George Albert Lyon
BY
Harry L. Duncan
ATTORNEY.

Patented Feb. 26, 1924.

1,485,041

UNITED STATES PATENT OFFICE.

GEORGE ALBERT LYON, OF PHILADELPHIA, PENNSYLVANIA.

RESILIENT BUFFER.

Application filed February 27, 1922, Serial No. 539,405. Renewed December 19, 1923.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Resilient Buffers, of which the following is a specification taken in connection with the accompanying drawing.

This application is a partial continuation of my copending application Serial No. 535,095, renewed February 8, 1922, and originally filed February 24, 1920, as Serial No. 360,585, that is, this case contains subject matter taken therefrom.

This invention relates especially to resilient buffers for automobiles or other vehicles in which looped buffer ends may be produced by outwardly projecting looped end attaching or buffer front members or both. The attaching members or elements may be formed of spring steel or other resilient strip material and may, in some cases, if desired, comprise duplex or closely spaced attaching portions adapted to be clamped or secured to the automobile frame members. These attaching elements may also preferably comprise outwardly and rearwardly extending end loops which may, in some cases, form the buffer ends and be formed with adjacent connector portions on either or both sides of these end loops, these connector portions being in some instances substantially straight to facilitate the adjustment of the parts. The attaching elements also preferably comprise inwardly extending aligned loops which may closely approach each other in some cases adjacent the center of the buffer front. The intermediate portions of these attaching elements may be curved so as to promote their resilient yielding action and may advantageously in some cases be given a gradually separating or diverging character from or adjacent the attaching portions to or toward their loop end connector portions. The buffer front member, which is preferably, though not necessarily, of resilient or spring steel material may bridge across the space between the attaching elements and may, in some cases, be formed with aligning elements such as one or more edge flanges cooperating with the connector portions of the attaching elements and clamped or connected thereto as by enclosing clamping devices or clips which may be advantageously arranged in some cases substantially in line with the attaching elements. This buffer front member which may be of spring channel construction with or without one or more reenforcing strips or members, where it is desired to form a multiple thickness buffer front may in some cases extend to or adjacent the buffer ends and may, if desired, be formed with looped ends more or less enclosing the looped end or connector portions of the attaching elements.

Figure 2:
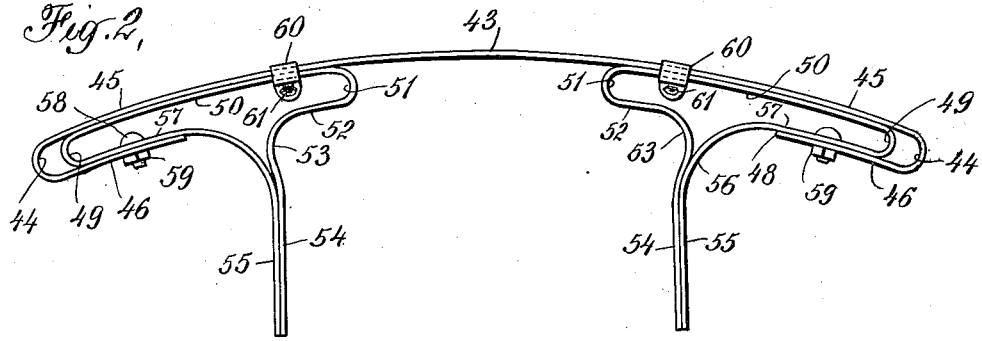
Figure 3:
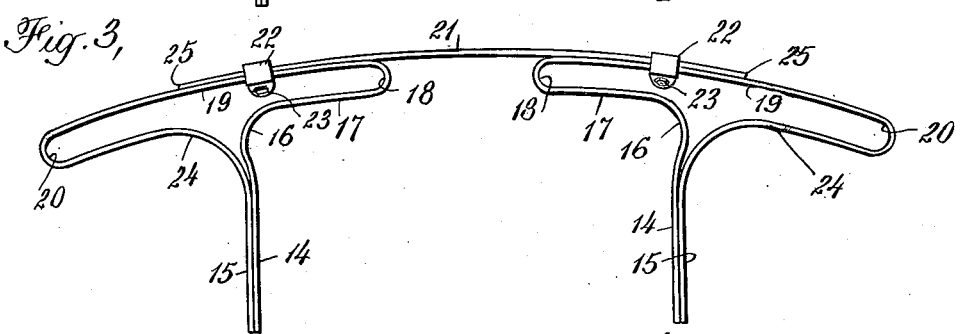
Figure 4:
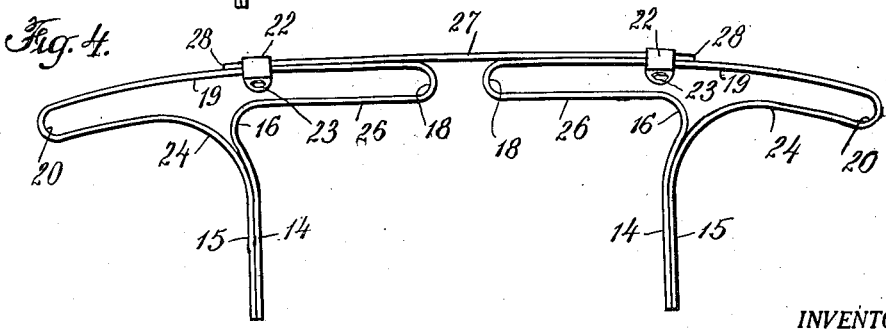

In the accompanying drawing showing in a somewhat diagrammatic way illustrative embodiments of this invention, Fig. 1 is a plan view partly in section showing one form of buffer, and Figs. 2 to 4 are plan views showing other illustrative forms of buffer.

The attaching elements which may advantageously be formed of tempered spring steel strip two inches or so wide in a vertical direction and a quarter to three-eighths inches thick more or less may, as indicated in Fig. 1, be advantageously formed with duplex or closely spaced attaching portions 12, 13, although it is not necessary in all cases to have both these attaching ends extend equally toward the frame or other portion of the vehicle to which they are bolted, clamped or otherwise secured in any suitable way. The attaching elements are preferably formed with end loops 6 which extend outwardly and rearwardly in a front automobile buffer in connection with which the invention is for convenience and clearness described and claimed, although it is of course understood that these buffers may be used as rear buffers on automobiles or other vehicles in which case the attached buffer ends might extend outward and forward as they are applied to the vehicle. The attaching elements preferably have substantially straight connector portions 4 adjacent the looped ends 6 and intermediate curved resilient portions 5, 11 promote the resilient yielding action of this part of the buffer so as to increase its impact absorbing or cushioning action.

The cooperating buffer front member 1 may as indicated be advantageously forwardly bowed and formed of spring channel having the flanges 2, 3, adapted to cooperate with the edges of the connector portions 4 of the attaching elements and have substantial aligning action in connection therewith so that when the parts fit reasonably tightly at these points as indicated in Fig. 1 the vertical rigidity and alignment of the buffer elements is considerably promoted. This buffer frame member may extend outward to its desired extent after engaging the connector portions of the attaching elements and in some cases the buffer front may be formed with ends 7, 8, preferably extending adjacent the ends of the buffer which are advantageously of looped form in most cases and these parts may be adjustably or otherwise connected in any suitable way as by enclosing clamping devices or clips 9, arranged upon or around the parts and detachably and rigidly connecting them when the bolts 10 are tightened.

Fig. 2 shows another illustrative arrangement in which the attaching members of spring steel or other strip material may have one or more attaching portions or ends 54, 55 to be clamped or secured to the automobile frame members while the outwardly extending looped end 48 may be of substantially uniform width throughout a considerable portion so as to form parallel connector portions 50, 57 on its opposite sides, if desired. This looped end connector portion may be connected to the attaching portion 55 by the curved resilient portion 56 of the strip which increases the resilient yield of the parts and, if desired, the inner ends of the attaching element strip may be extended still further inward, and may have an inwardly turned connector loop such as 51 joined by the curved portions 52, 53 to the attaching portion or end 54 of the strip. In this case the buffer front member which may be of spring strip construction may be forwardly and substantially uniformly arched or bowed so as to have a forwardly extending central portion 43 and similarly arched or bowed connector portions 45 terminating in the buffer end loops 44 while, if desired, a rear connector portion, such as 46 may be arranged substantially parallel to the forward connector portion 45 of this buffer front member. The inturned ends 8 of this buffer front member are thus located a considerable distance inside the end loops 44 so that extended connector portions are provided between these points to more securely engage and support the cooperating connector portions of the attaching elements which may be moved or forced into the desired adjusted position when the buffer is assembled on an automobile or other vehicle and then securely clamped in adjusted position so that the desired strength and rigidity of the parts is ensured. For this purpose enclosing clamping devices or clips 60 may in some cases enclose these cooperating connector portions at any suitable points preferably substantially in line with the attaching portions to be connected to the automobile frame member. Also, if desired, additional clamping or connecting means may be employed such as the connecting bolts 58 extending through slots in one or both of the connector portions so as to provide the desired range of adjustment before the nuts 59 are tightened. By forming these different types of buffer with substantially similar spring strip attaching elements their convenient and close packing is promoted. These duplex attaching portions or ends also give increased strength and stiffness to this part of the buffer and minimize the chances of breakage or failure under collision conditions.

In the illustrative buffer shown in Fig. 3 the resilient attaching elements may each have one or more attaching portions or ends 14, 15 to be secured to the automobile frame while the outwardly extending looped end 20 connected by the curved resilient portion 24 may form the end of the buffer, the front strip 19 of this element extending inward in straight or curved form so that the inturned inner loop 18 may approach and be aligned with the corresponding inturned loop on the other generally similar attaching element. If desired, the inner loop 18 may have its rear strip 17 substantially parallel to the front portion of the element at this point and an outwardly bent resilient portion 16 is sometimes desirable to increase the resilience of the inner loop portion. One or more buffer front members or strips such as 21 may be used to hold these inwardly extending loops in substantial alignment and also to bridge across the space between them. A single spring steel strip 21 is shown for this purpose and may have its ends 25 extend in some cases out a little beyond the attaching members and be clamped or connected to each of the attaching elements by one or more clamping devices or clips 22 tightened as by the bolts 23.

In the Fig. 4 illustrative buffer the duplex attaching elements of spring steel strip may, as indicated, have their inturned loops 18 extend still further toward each other so as to closely approach the cooperating loop and the front strips 19 of these resilient elements may be substantially straight and aligned at least inside the attaching members or arms 14, 15, although for some purposes it is desirable to have the outwardly extending end loops 20 rearwardly bent at least to a slight extent so that they can more effectively protect the adjacent automobile wheels. The rear strips 26 of the inwardly extending loops adjacent the center of the buffer front may, as indicated, be substantially parallel to the front strips in some cases and may be joined to the attaching members through the resilient curved portion 16 which give additional cushioning action, especially where these buffer elements are struck near the ends of the inturned loops in case no additional reenforcing or bridging member is employed. It is usually desirable, however, to have one or more reenforcing front strips or members such as 27 which may be secured to the front strips of each of the attaching elements as by one or more enclosing or clamping devices 22 and the ends 28 of these front strips may extend out about in front of the attaching members or arms 14, 15, which may, if desired, be of duplex construction as shown.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims:

1. The resilient automobile buffer comprising two substantially similar spring strip attaching elements each having a duplex attaching portion adapted to be secured to an automobile frame member and having an outwardly and rearwardly extending end loop adapted to form the end of the buffer and having an inwardly turned loop extending inward considerably from said attaching portions to approach and be aligned with the cooperating inwardly turned loop of the other attaching element, and a spring strip buffer front member adjustably and rigidly connected to the front strip of said inwardly turned loops.

2. The resilient automobile buffer comprising two substantially similar spring strip attaching elements each having a duplex attaching portion adapted to be secured to an automobile frame member and having an outwardly extending end loop adapted to form the end of the buffer and having an inwardly turned loop extending inward considerably from said attaching portions to approach the cooperating inwardly turned loop of the other attaching element, and a spring strip buffer front member adjustably connected to the front strip of said inwardly turned loops.

3. The resilient automobile buffer comprising two substantially similar spring strip attaching elements each having a duplex attaching portion adapted to be secured to an automobile frame member and having an outwardly and rearwardly extending end loop adapted to form the end of the buffer and having an inwardly turned loop extending inward considerably from said attaching portions to approach and be aligned with the cooperating inwardly turned loop of the other attaching element, and a resilient buffer front member adjustably connected to the front strip of said inwardly turned loops.

4. The resilient automobile buffer comprising two substantially similar spring strip attaching elements each having a duplex attaching portion adapted to be secured to an automobile frame member and having an outwardly extending end loop adapted to form the end of the buffer and having an inwardly turned loop extending inward considerably from said attaching portions to approach and be aligned with the cooperating inwardly turned loop of the other attaching element, and a resilient buffer front member connected to said inwardly turned loops.

5. The resilient automobile buffer comprising two strip attaching elements each having a portion adapted to be secured to an automobile frame member and having an outwardly extending end loop adapted to form the end of the buffer and having an inwardly turned loop extending inward considerably from said attaching portions to approach the cooperating inwardly turned loop of the other attaching element, and a resilient buffer front member connected to said inwardly turned loops.

6. The resilient automobile buffer comprising two substantially similar spring strip attaching elements each having a duplex attaching portion adapted to be secured to an automobile frame member and having an outwardly and rearwardly extending end loop adapted to form the end of the buffer and having an inwardly turned loop extending inward considerably from said attaching portions to closely approach and be substantially aligned with the cooperating inwardly turned loop of the other attaching elements, and a buffer front member connected to the front strip of said inwardly turned loops.

7. The resilient automobile buffer comprising two substantially similar strip attaching elements each having an attaching portion adapted to be secured to an automobile frame member and having an outwardly extending end loop adapted to form the end of the buffer and having an inwardly turned loop extending inward considerably from said attaching portions to closely approach and be substantially aligned with the cooperating inwardly turned loop of the other attaching elements.

8. The resilient automobile buffer comprising two spring strip attaching elements each having an attaching portion adapted to be secured to an automobile frame member and having an outwardly extending end loop adapted to extend into protective position adjacent the automobile wheels and form the end of the buffer and having an inwardly turned loop extending inward considerably from said attaching portions to approach the cooperating inwardly turned loop of the other attaching element.

9. The resilient automobile buffer comprising two spring strip attaching elements each having an attaching portion adapted to be secured to an automobile frame member and having an outwardly extending end loop adapted to extend into protective position adjacent the automobile wheels and form the end of the buffer and having an inwardly turned loop extending inward considerably from said attaching portions to approach the cooperating inwardly turned loop of the other attaching element, and means to hold said adjacent inwardly turned loops in lateral alignment and bridge the space between said elements.

GEORGE ALBERT LYON.